(12) United States Patent
LeBegue et al.

(10) Patent No.: US 6,390,720 B1
(45) Date of Patent: May 21, 2002

(54) METHOD AND APPARATUS FOR CONNECTING A TUBE TO A MACHINE

(75) Inventors: Jeffrey S. LeBegue; Daniel E. Loringer, both of Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/422,432

(22) Filed: Oct. 21, 1999

(51) Int. Cl.[7] ................................................ F16L 13/14
(52) U.S. Cl. ........................ 403/279; 285/342; 403/281
(58) Field of Search ................................. 403/279, 274, 403/278, 281, 282; 285/382.2, 382.7, 123.4, 123.5, 342

(56) References Cited

U.S. PATENT DOCUMENTS

| | | | |
|---|---|---|---|
| 3,075,793 A | * | 1/1963 | Lennon et al. ............... 285/342 |
| 3,705,753 A | | 12/1972 | Bierlein et al. |
| 3,879,070 A | * | 4/1975 | Russ ......................... 285/342 |
| 3,976,342 A | | 8/1976 | Leyendecker et al. |
| 4,277,200 A | | 7/1981 | Speakman |
| 4,468,148 A | | 8/1984 | Seymour |
| 4,556,242 A | | 12/1985 | Kowal et al. |
| 4,600,479 A | | 7/1986 | Thoma et al. |
| 4,655,486 A | | 4/1987 | Tarnay et al. |
| 4,844,517 A | * | 7/1989 | Beiley et al. ........... 285/342 X |
| 4,874,193 A | * | 10/1989 | Martin ................... 285/342 X |
| 5,080,406 A | | 1/1992 | Hyatt et al. |
| 5,129,253 A | | 7/1992 | Austin et al. |
| 5,312,696 A | | 5/1994 | Beers et al. |

* cited by examiner

*Primary Examiner*—Lynne H. Browne
*Assistant Examiner*—John R. Cottingham
(74) *Attorney, Agent, or Firm*—Carl A. Rowold, Esq.; David G. Maire, Esq.; Beusse Brownlee Bowdoin & Wolter, PA

(57) ABSTRACT

A connection of a tube to a machine includes a plurality of rolled grooves in a region of contact between the collet of a compression fitting and the tube. The grooves reduce the occurrence of fretting of the tube surface while a region of residual compressive stress formed in the tube proximate the bottom of each groove by the rolling process serves to counteract the stress concentration created by the grooves. In one embodiment a single groove formed in a thread pattern extends from above collet to within the area of contact.

16 Claims, 1 Drawing Sheet

METHOD AND APPARATUS FOR CONNECTING A TUBE TO A MACHINE

BACKGROUND OF THE INVENTION

The present invention relates generally to the field of mechanical connections, and more particularly to the connection of a tube to a machine, and specifically to a method and apparatus for avoiding fretting failure in a tube connected to a machine.

It is known that adjoining mechanical components subjected to alternating stresses between the components are subject to fretting of the contacting surfaces of the components. Of particular interest to the assignee of the present invention is the connection of a fuel tube to an engine, such as the engine of a locomotive. It is known to attach a fuel tube to an engine by using a compression fitting, wherein a tapered collet is compressed against a fuel tube by threading a nut onto the engine or onto an attachment thereto. Vibration produced by the engine during operation imparts an alternating load on the tubing in the region of contact with the collet of the compression fitting. Such alternating mechanical loads can produce alternating micro-movements between the tubing and the collet, which in turn may produce fretting of the tube and/or collet surfaces. Cracks produced in the tube wall as a result of such fretting may result in failure of the tubing if the loading on the tubing is sufficiently high.

It is known in the prior art to reduce or eliminate fretting by forming grooves in one or both abutting surfaces subject to alternating loads. For example, U.S. Pat. 3,976,342 issued on Aug. 24, 1976, to Leyendecker, et al., describes how closely-spaced cavities are used to reduce fretting wear between relatively moving parts. Similarly, U.S. Pat. 4,468,148 issued on Aug. 28, 1984, to Seymour, describes the use of slots on abutting surfaces on a vibrating part. However, the applicant has found that the use of such cavities or slots in the application of a tube in a compression fitting is unacceptable since the resulting stress concentration created by a cavity or slot can result in the failure of the tube independent of any fretting damage. U.S. Pat. 5,080,406 issued on Jan. 14, 1992, to Hyatt, et al., describes a fitting for a tube that has a balanced configuration in order to minimize fretting. The balanced configuration eliminates the axial movement between the tube and the fitting, and is achieved by taking into consideration the loadings, moduli of elasticity and restraining conditions. Designing for such application-specific variables makes the apparatus of Hyatt a costly and non-standard component.

BRIEF SUMMARY OF THE INVENTION

There is a particular need for an improved method and apparatus for avoiding fretting failure in a tube connected to a machine. A connection to a machine is described herein comprising: a fitting adapted to be connected to a machine and adapted to receive an end of a tube for attachment thereto, the fitting comprising a collet and a nut for compressing the collet onto the outside surface of a tube; a tube having an end disposed within the fitting and having an area in contact with the collet; a groove formed on the outside surface of the tube proximate the collet, and a region of residual compressive stress in the tube proximate a bottom surface of the groove. In one embodiment described herein, the groove is formed in a thread pattern extending from a point on the tube outside the area of contact with the collet to a point within the area of contact with the collet. A method for connecting a tube to a machine is also described herein, the method comprising: forming a groove on the outside surface of a tube in a manner providing of region of residual compressive stress in the tube proximate the bottom of the groove; and installing the end of the tube into a compression fitting attached to the machine so that the groove is proximate an end of the fitting opposed the machine. In one embodiment, the method includes the step of rolling the groove into the outside surface of the tube in a thread pattern. In a further embodiment of the invention, the method includes the step of forming a second groove on the outside surface of the tube proximate the first groove, and further, positioning the tube so that the first groove is located in an area of the tube in contact with the fitting and the second groove is located outside the area of the tube in contact with the fitting.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
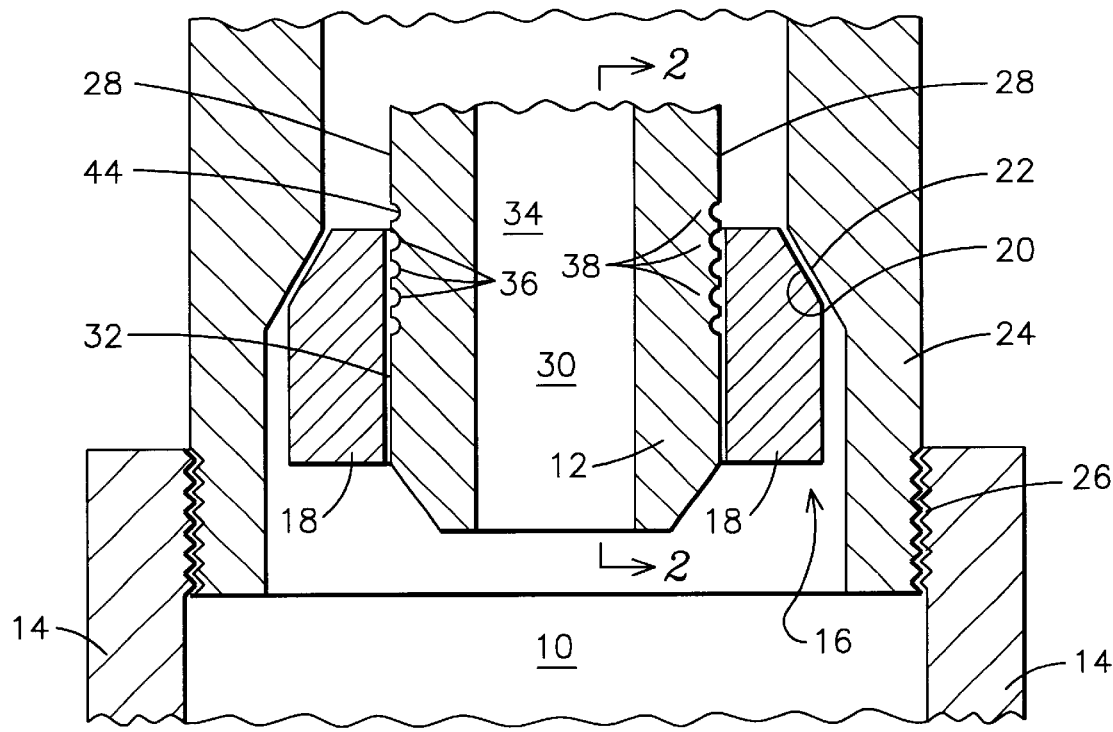
FIG. 1 is a partial sectional view of a tube containing a plurality of rolled grooves in its outside surface connected to a machine by a compression fitting.

FIG. 1 illustrates a connection 10 of a tube 12 to a machine 14 by means of a compression fitting 16. Machine 14 may be, for example, the engine of a locomotive, and the tube 12 may be, for example, the high pressure fuel supply line for the engine. Compression fitting 16 includes a collet 18 having a tapered surface 20 which is adapted to mate with a tapered surface 22 of a nut 24. Nut 24 is removably connected to machine 14 by a threaded joint 26 which provides a means for compressing the collet 18 onto the outside surface 28 of tube 12. When the end portion 30 of tube 12 is disposed within the fitting 16 and nut 24 is tightened, there is an area of contact 32 between the collet 18 and the outside surface 28 of the tube 12. As the tube 12 is subjected to alternating loads, such as by the vibration of the machine 14, it is known that the area of contact 32 may be subject to fretting. There is a region 34 of the tube 12 located proximate the end of the collet 18 opposed the machine 14 wherein the stress in the tube will achieve a maximum value during operation of machine 14. Such fretting may cause micro-fissures or cracks in the outside surface 28 of tube 12. Such micro fissures are known to be self-limiting unless the stress within the wall of the tube exceeds a critical value necessary to propagate such cracks through the thickness of the tube wall.

The applicants have found that by forming one or more rolled grooves 36 in the outside surface 28 of tube 12 proximate the collet 18, a more robust connection 10 can be achieved with a standard compression fitting 16. Grooves 36 may be a plurality of individual parallel grooves displaced from each other along the axis of the tube 12, or they may be a single groove formed in a thread pattern, i.e., a single groove 36 which is displaced axially along the tube as the tube is rotated about its axis. Importantly, grooves 36 are formed in a manner providing a region 38 of residual compressive stress in the tube 12 proximate the bottom of the groove 36. Such a region 38 of residual compressive stress may be formed by the single operation of rolling a groove 36 into the outer surface 28 of tube 12. Alternatively, groove 36 may be formed by a first metal removing step, such as by turning on a lathe, with the region 38 of compressive stress being formed by a separate manufacturing step, such as shot peening the surface 28 of the tube following the groove forming operation.

Figure 2:
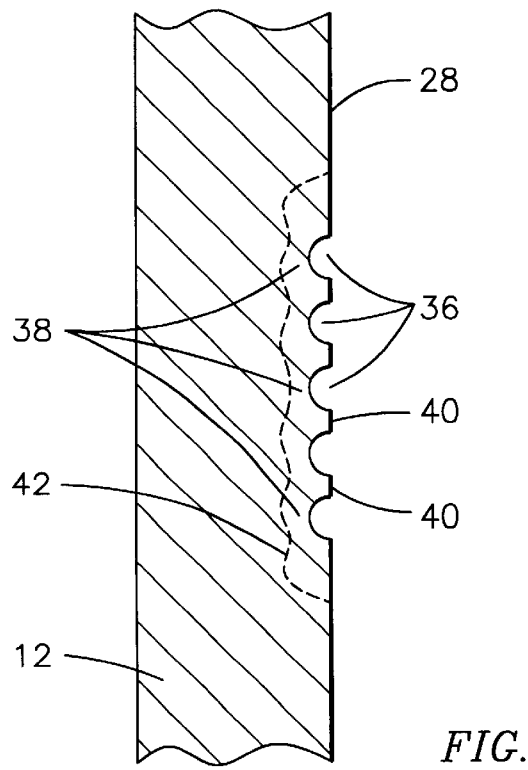
FIG. 2 illustrates a distribution of stress in the wall of the tube of FIG. 1 as viewed along section 2-2 of FIG. 1.

FIG. 2 illustrates a partial sectional view of tube 12 of FIG. 1 showing a stress distribution within the tube 12. Grooves 36 can be seen in FIG. 2 as being formed on the outer surface 28 of tube 12. Between adjacent grooves 36 a portion of the original outer surface 28 remains a land 40. The lands 40 form a portion of the area of contact 32 between the tube 12 and the collet 18 as shown in FIG. 1. Line 42 is drawn at the location of the peak stress within the wall of the tube 12. Line 42 illustrates how the stress at the lands 40 has been reduced by the presence of the grooves 36, thereby reducing the likelihood of fretting. Even if fretting cracking does occur along the surface of lands 40, such cracks are unlikely to propagate through the thickness of the tube wall because the area of peak stress 42 has been relocated away from the surface 28 of the tube in the area of the grooves 36. Note that the region 38 of residual compressive stress in the tube 12 proximate the bottom surface of the grooves 36 has a magnitude sufficient to counteract the notch effect of the grooves 36. As a result, the peak stress in the tube 12 resulting from a load on the tube is no more than the peak stress in a similarly situated tube wherein the grooves 36 and region 38 of residual compressive stress are not present. Importantly, the peak stress 42 is displaced from the bottom of grooves 36 by the presence of the region 38 of residual compressive stress. Prior art applications of cavities or slots formed to reduce fretting of a surface have not been formed by a process wherein a region of residual compressive stress remains proximate the bottom of the cavity or slot. For example, Hyatt teaches the forming of slots by a broaching process, thereby creating a stress concentration area at the bottom of the slot with no counterbalancing residual compressive stress. The applicants have found that the grooves 36, which reduce the stress at the area of contact 32, in combination with the region 38 of residual compressive stress, which counteracts the stress concentration effect of the grooves 36, results in a robust connection 10 capable of withstanding significantly higher alternating loads in the tube 12 without failure than a similar connection without such grooves and regions of residual compressive stress. The applicants have further found that grooves 36 rolled into the outside surface 28 of a tube 12 provide such an improvement over the prior art.

The selection of the number, size, depth, and spacing of the grooves 36 is application-specific. The depth and spacing of the grooves 36 should be selected so that the region of peak stress does not flow up to the surface 28 of the tube between adjacent grooves 36. The radius of the grooves should be selected with consideration given to the level of stress concentration caused by the groove, with a larger radius groove generating less of a stress concentration than a smaller radius groove. At least one groove may be formed in the area of the tube not in contact with collet 18, as illustrated by groove 44 in FIG. 1. By locating groove 44 beyond the end of collet 18, it is assured that the peak stress 42 will be displaced from tube surface 28 at the critical region 34 proximate the end of collet 18 opposed machine 14. In the embodiment where grooves 36 are formed as a single groove in a thread pattern, the groove 36 may be formed to extend from a point on the tube 12 outside the area of contact 32 with the collet 18 to a point within the area of contact 32 with the collet 18. It may be appreciated that the severity of fretting and the probability of failure of tube 12 is increased proximate region 34 having the highest alternating loads. The number of grooves 36 and the portion of the total area of contact 32 which is grooved is an application-specific variable. In one embodiment for a high pressure fuel tube 12 of an engine 14 of a locomotive, a stainless steel fuel tube having an outside diameter of 14 mm and a wall thickness of 5 mm is formed to have five parallel axial grooves rolled into the surface 28 of the tube 12. Such grooves 36 have a radius of 0.6 mm and a depth of 0.27 mm and are spaced 2 mm apart on center. Each of these dimensions are nominal dimensions subject to normal manufacturing tolerances known in the art. One of such grooves 44 is formed to be above the area of contact 32 between the collet 18 and the tube 12. Such rolled grooves 36 may be formed on the outside surface of tube 12 by known manufacturing processes, thereby providing a region 38 of residual compressive stress in the tube proximate the bottom of the grooves 36. The end 30 of the tube 12 containing the grooves 36 is then installed into a standard compression fitting 16 and attached to the machine 14 so that the grooves 36 are proximate the collet 18 of fitting 16. Such a geometry insures that the land area 40 is maintained at a reduced level of stress when compared to a similarly situated tube formed without such rolled grooves 36.

Further, the region 38 of residual compressive stress resulting from the rolling process insures that the effects of the stress concentration created by the grooves 36 is counteracted so that the overall load bearing capacity of the connection 10 is improved.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A connection (10) to a machine (14) comprising:
    a fitting (16) adapted to be connected to a machine (14) and adapted to receive an end of a tube for attachment thereto, the fitting comprising a collet (18) and a nut (24) for compressing the collet onto the outside surface of a tube;
    a tube (12) having an end (30) disposed within the fitting and having an area (32) in contact with the collet; and
    a plurality of grooves (36) formed on the outside surface (28) of the tube proximate the collet and a region of residual compressive stress in the tube proximate a radially inner surface of each of the plurality of grooves, wherein a first (44) of the plurality of grooves is located in an area of the tube not in contact with the collet proximate an end of the collet opposed the machine.

2. The connection of claim 1, wherein the plurality of grooves are formed in a helical pattern extending from a point on the tube outside the area of contact with the collet to a point within the area of contact with the collet.

3. The connection of claim 1, wherein the residual compressive stress has a magnitude sufficient to counteract the stress concentration caused by the groove so that the peak stress (42) in the tube resulting from a load on the tube is no more than the peak stress in a similarly situated tube wherein the groove and region of residual compressive stress are not present.

4. The connection of claim 1, wherein tube has a nominal outside diameter of 14 mm and a nominal wall thickness of 5 mm, and each groove has a nominal radius of 0.6 mm and a nominal depth of 0.27 mm, and wherein the grooves are nominally spaced 2 mm apart on centers.

5. A connection (10) to a machine comprising:

a tube (12);

a compression fitting (16) comprising a collet (18) in contact with the tube along an area of contact (32) and further comprising a nut (24) attached to a machine (14) and in compressive contact with the collet; and a groove (36) formed in the outside surface of the tube, the groove being disposed in the tube proximate an end of the collet opposed the machine so that a location of peak stress in the tube is displaced remote from the area of contact by the presence of the groove.

6. The connection of claim 5, wherein the groove is formed in a helical pattern extending from a point on the tube outside the area of contact with the collet to a point within the area of contact with the collet.

7. The connection of claim 5, wherein a first annular groove (44) is positioned outside the area of contact with the collet, and a second annular groove is positioned within the area of contact with the collet.

8. The connection of claim 6 further comprising a plurality of annular grooves formed in the outside surface of the tube proximate the collet, wherein a first (44) of the plurality of grooves is located in an area of the tube not in contact with the collet proximate an end of the collet opposed the machine.

9. The connection of claim 6, wherein the tube has a nominal outside diameter of 14 mm and a nominal wall thickness of 5 mm, and the groove has a nominal radius of 0.6 mm and a nominal depth of 0.27 mm.

10. The connection of claim 5, further comprising an area of residual compressive stress in the tube proximate a bottom surface of the groove.

11. The connection of claim 10, wherein the groove comprises a rolled groove.

12. A connection (10) to a machine (14) comprising:

a tube (12) having an end (30) and an outside surface (28);

a compression fitting (16) adapted to be connected to a machine (14) and for receiving the end of the tube for attachment thereto, the tube having a portion (32) of its outside surface in contact with the fitting; and a groove (36) formed on the outside surface of the tube and bordering the portion in contact with the fitting proximate an end of the fitting opposed the machine, a location of peak stress (42) in the tube displaced away from the portion of the outside surface in contact with the end of the fitting opposed the machine by the presence of the groove.

13. The connection of claim 12 further comprising a region of residual compressive stress in the tube proximate a radially inner surface of the groove.

14. The connection of claim 13, wherein the residual compressive stress has a magnitude sufficient to counteract the stress concentration caused by the groove so that the peak stress in the tube is no more than the peak stress in a similarly situated tube wherein the groove and region of residual compressive stress are not present.

15. The connection of claim 12, wherein the groove comprises a rolled groove.

16. The connection of claim 12, wherein the groove is formed in a helical pattern extending from a point on the tube outside the area of contact with the fitting to a point within the area of contact with the fitting.

* * * * *